UNITED STATES PATENT OFFICE.

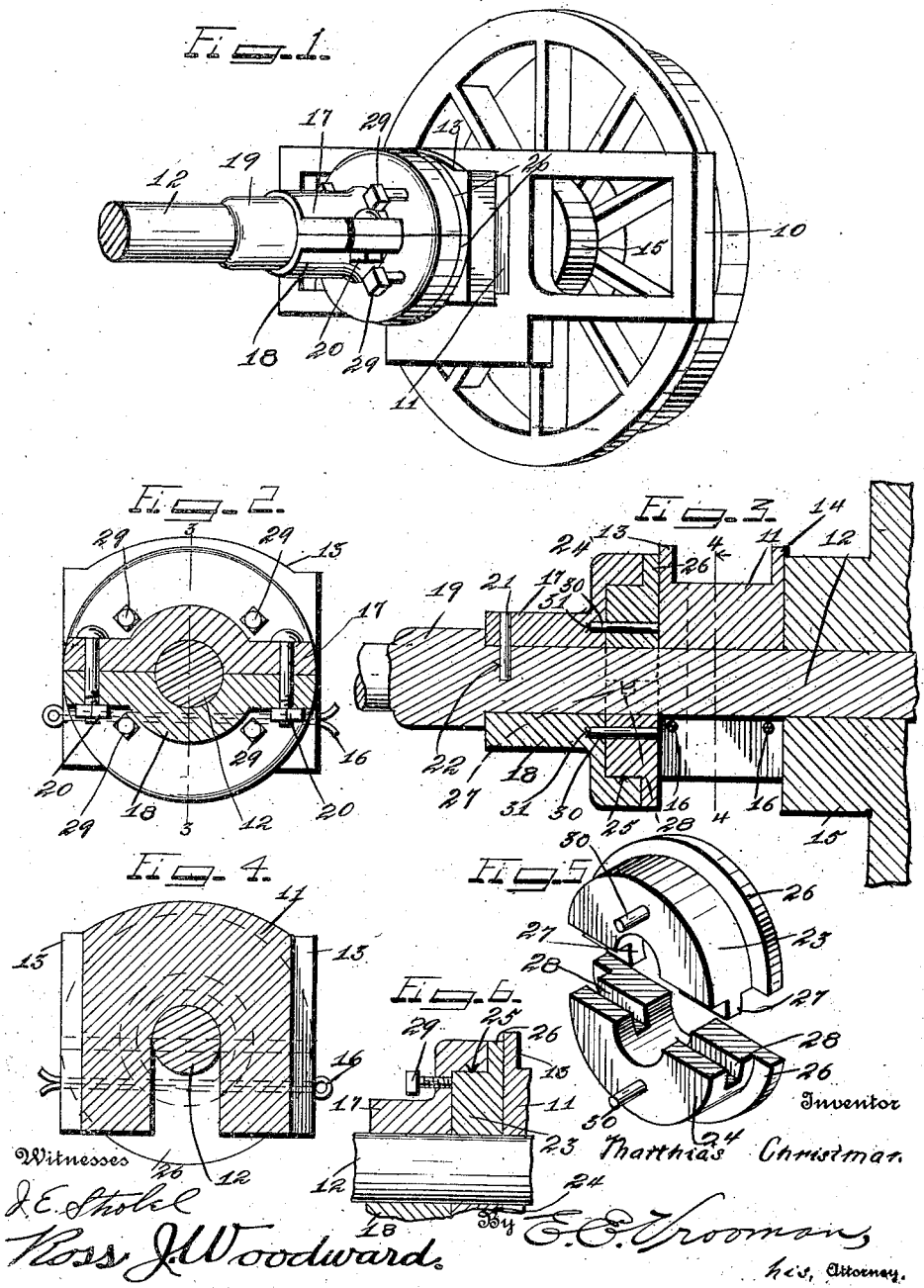

MATTHIAS CHRISTMAN, OF SPRINGFIELD, MISSOURI, ASSIGNOR OF ONE-THIRD TO HARRY L. BISSETT AND ONE-THIRD TO GEORGE A. McLAUGHLIN, BOTH OF SPRINGFIELD, MISSOURI.

HUB-PLATE.

1,091,192.  Specification of Letters Patent.  Patented Mar. 24, 1914.

Application filed July 31, 1913. Serial No. 782,306.

*To all whom it may concern:*

Be it known that I, MATTHIAS CHRISTMAN, a citizen of the United States of America, residing at Springfield, in the county of Greene and State of Missouri, have invented certain new and useful Improvements in Hub-Plates, of which the following is a specification, reference being had therein to the accompanying drawing.

This invention relates to an improved hub plate and the principal object of the invention is to provide a collar which can be removably connected with the axle and which carries plates adjustably connected with the collar so that they may be moved to compensate for the wear upon their outer faces.

Another object of the invention is to so construct the collar and plates that they will turn together with the axle.

Another object of the invention is to so construct the axle that the collar will be prevented from sliding along the axle in one direction, thus permitting the plates to be held in engagement with the bearing box or driving box carried by the frame of the locomotive or car.

This invention is illustrated in the accompanying drawing, wherein:

Figure 1 is a perspective view showing the improved hub plate in position. Fig. 2 is a sectional view through the axle and collar of the hub plate. Fig. 3 is a section taken along the line 3—3, Fig. 2. Fig. 4 is a sectional view taken along the line 4—4, Fig. 3. Fig. 5 is a perspective view of the plates which are carried by the collar. Fig. 6 is a fragmentary sectional view showing the means for adjusting the plates.

In the accompanying drawings, the numeral 10 indicates a portion of the locomotive frame or car truck which carries the box 11 through which the spindle 12 of the axle passes. This axle is provided with a spindle at each end, and since both ends of the axle are constructed alike, only one has been shown. The bearing box 11 is provided with side flanges 13 and 14, which flanges are provided so that the box will have relatively large bearing faces which are larger than the diameter of the wheel hub 15, and hub plate, so that the wheel and hub plate will not wear grooves in the bearing box. This box passes through an opening formed in the frame of the locomotive or truck as shown in Fig. 1, and is provided with an opening so that the box can be placed about the axle and secured thereto by the keys 16. It is, of course, obvious that any other securing means desired can be used in place of the keys.

The hub plate comprises a collar formed from the two sections 17 and 18 placed about the axle between the bearing box 11 and abutment 19 and secured together by the bolts 20. The section 17 carries a pin 21 which extends through the section and into an opening 22 formed in the spindle of the axle so that when the axle rotates the collar will rotate with it. By having the collar formed in two sections, the wheel does not have to be removed when it is desired to put the collar in place and, therefore, a great deal of time will be saved when applying the hub plate to the axle. It is also to be seen that by having the collar formed in two parts it is not necessary to heat the collar in order to shrink it upon the axle and that, therefore, the collar can be put into place with a great deal less trouble than would be the case were it necessary to heat the collar.

The plate which is carried by the collar comprises the two sections 23 and 24 which fit within a counterbored chamber 25 formed in the collar and are provided with flanges 26 extending over the outer edge of the collar as shown in Figs. 3 and 6. The section 23 is provided with tenons 27, which tenons fit within mortises 28 formed in the edges of the section 24. By having these sections connected with the mortise and tenon, the two sections will move transversely together, thus preventing any danger of one section being forced outwardly farther than the second section. Adjusting screws 29 are carried by the collar and have their inner ends engaging the two sections of the hub plate so that when the outer face of the hub plate is worn a sufficient amount to permit side play, the set screws can be tightened and the hub plate thus forced out of the pocket 25 and thus be brought into engagement with the bearing box.

Pins 30 are carried by the hub plate and have their inner end extending into the sockets 31 formed in the two sections of the collar so that when the collar is rotated with the axle, the hub plate will rotate with the collar.

By this construction, a hub plate has been provided which can be easily connected with the axle and which will hold the bearing box tightly in engagement with the wheel, thus preventing all side play. It will also be noted that when the outer faces of the plates have been worn, the set screws can be tightened, thus taking up the wear and keeping the plates tightly in engagement with the bearing box.

What is claimed is:—

1. A bearing box, an axle passing through said bearing box, a collar carried by said axle, and a plate carried by said axle adjustably attached to said collar for engaging said bearing box.

2. A bearing, an axle passing through said bearing, a collar removably connected with said axle, and rotating with the same, and a plate carried by said axle, said plate positioned upon the side of said collar and being adjustably connected with said collar, whereby said plate may be held in close contact with said bearing.

3. A bearing, an axle passing through said bearing, an abutment carried by said axle, a collar carried by said axle between said abutment and bearing, a plate carried by said collar and rotating with the same, and set screws carried by said collar and engaging said plate whereby said plate may be adjusted and kept in close contact with said bearing.

4. A bearing, an axle passing through said bearing, a collar carried by said axle and comprising a plurality of sections placed about the same, means for holding the sections of the collar together, a plate positioned between the collar and bearing and fitting into a counterbored chamber formed in the outer face of said collar, and means carried by said collar for forcing the plate outwardly whereby the plate may be kept in close contact with the bearing.

5. A bearing, an axle passing through said bearing, an abutment formed upon said axle, a collar fitting about said axle between said bearing and said abutment, a pin carried by said collar and fitting into a socket formed in said axle whereby said collar will rotate with said axle, a plate carried by said collar and positioned between said collar and bearing, pins carried by said plate and extending into sockets formed in said collar whereby said plate and collar will rotate together, and means for moving said plate into close engagement with said bearing.

6. A device of the character described, comprising a collar having one end provided with a counterbored chamber, said collar being formed from a plurality of sections removably connected together, a plate fitting within the chamber of said collar, and means carried by said collar for engaging the plate and forcing the same out of said chamber.

7. A device of the character described, comprising a collar having one end counterbored to form a chamber, a plate fitting within said chamber, pins carried by said plate and extending into said collar to prevent independent rotary movement of said plate and collar, and set screws carried by said collar and engaging said plate whereby said plate may be moved out of said chamber.

8. A device of the character described, comprising a collar having one end portion counterbored to form a chamber, a plate fitting within said chamber and provided with edge flanges extending over the face of said collar, said plate comprising a plurality of sections provided with interlocked abutting ends whereby the sections of the plate will be prevented from having independent outward movement in said chamber, pins carried by the sections of the plate and extending into sockets formed in said collar, and set screws carried by said collar and engaging the inner face of said plate for forcing the plate out of said chamber.

In testimony whereof I hereunto affix my signature in presence of two witnesses.

MATTHIAS CHRISTMAN.

Witnesses:
ROBERT MOSBY COWALL,
GEORGE ARNOLD MCLAUGHLIN.